United States Patent
Murphy (10) Patent No.: US 7,567,576 B2
(45) Date of Patent: Jul. 28, 2009

(54) METHOD AND APPARATUS FOR THROTTLING AUDIO PACKETS ACCORDING TO GATEWAY PROCESSING CAPACITY

(75) Inventor: James Murphy, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 725 days.

(21) Appl. No.: 11/031,254

(22) Filed: Jan. 6, 2005

(65) Prior Publication Data

US 2005/0122985 A1 Jun. 9, 2005

Related U.S. Application Data

(63) Continuation of application No. 09/475,751, filed on Dec. 30, 1999, now Pat. No. 6,856,613.

(51) Int. Cl.
*H04L 12/56* (2006.01)
*G06F 15/16* (2006.01)

(52) U.S. Cl. .................. 370/401; 370/352; 370/466; 709/224; 709/233

(58) Field of Classification Search .......... 370/232, 370/352–356, 265, 392, 401–410, 389, 466–469; 709/221–238
See application file for complete search history.

(56) References Cited

U.S. PATENT DOCUMENTS

| | | | |
|---|---|---|---|
| 4,731,816 A | 3/1988 | Hughes-Hartogs | |
| 4,769,815 A | 9/1988 | Hinch et al. | |
| 4,771,391 A | 9/1988 | Blasbalg | |
| 5,115,429 A | 5/1992 | Hluchyj et al. | |
| 5,231,633 A | 7/1993 | Hluchyj et al. | |
| 5,506,844 A | 4/1996 | Rao | |
| 5,764,645 A | 6/1998 | Bernet et al. | |

(Continued)

FOREIGN PATENT DOCUMENTS

EP 0942560 A2 2/1999

(Continued)

OTHER PUBLICATIONS

Lettieri et al., "Adaptive Frame Length Control for Improving Wireless Link", 1998, IEEE, pp. 564-571.

(Continued)

*Primary Examiner*—Afsar M. Qureshi
(74) *Attorney, Agent, or Firm*—Stolowitz Ford Cowger LLP (57) ABSTRACT

Rather than dropping packets, the invention throttles the rate that audio packets are output from a voice gateway by increasing the VoIP packet size. An encoder in the voice gateway encodes audio signals into audio packets. A processor in the voice gateway then switches the audio packets to the IP network. The invention throttles the rate that these VoIP packets are switched from the voice gateway by varying the number of samples of the incoming audio signals that are encoded into each packet payload. By increasing the packet payload size in the VoIP packets, the voice gateway can switch the same amount of audio data in fewer VoIP packets. Producing fewer VoIP packets increases the available capacity of the voice gateway for processing audio signals for more calls. In other words, encoding more audio data into each VoIP packet keeps the voice gateway from having to drop packets. If capacity in the voice gateway increases (the number of incoming calls decreases), the voice gateway can resume generating VoIP packets at the original packet size.

25 Claims, 4 Drawing Sheets

U.S. PATENT DOCUMENTS

| | | | |
|---|---|---|---|
| 5,844,600 A * | 12/1998 | Kerr | 348/14.12 |
| 5,940,479 A | 8/1999 | Guy | |
| 6,002,669 A | 12/1999 | White | |
| 6,003,089 A | 12/1999 | Schaffer et al. | |
| 6,005,871 A | 12/1999 | Petersen et al. | |
| 6,006,253 A | 12/1999 | Kumar et al. | |
| 6,052,368 A | 4/2000 | Aybay | |
| 6,400,711 B1 | 6/2002 | Pounds et al. | |
| 6,421,720 B2 * | 7/2002 | Fitzgerald | 709/224 |
| 6,424,647 B1 | 7/2002 | Ng et al. | |
| 6,452,915 B1 | 9/2002 | Jorgensen | |
| 6,584,070 B1 | 6/2003 | Takashima et al. | |
| 2001/0023454 A1 | 9/2001 | Fitzgerald | |
| 2001/0046237 A1 | 11/2001 | Chan et al. | |
| 2002/0093982 A1 | 7/2002 | Joy et al. | |

OTHER PUBLICATIONS

Hashimoto, "End-to-end QoS Architecture for Continuous Media Services" 1998, IEEE, pp. 490-495.

* cited by examiner

METHOD AND APPARATUS FOR THROTTLING AUDIO PACKETS ACCORDING TO GATEWAY PROCESSING CAPACITY

This application is a continuation of prior U.S. Ser. No. 09/475,751, filed Dec. 30, 1999, now issued as U.S. Pat. No. 6,856,613.

BACKGROUND OF THE INVENTION

This invention relates generally to packet switched networks and more particularly to dynamically throttling audio packets according to the utilization capacity of a Voice over Internet Protocol (VoIP) gateway.

In VoIP applications, an originating voice gateway quantizes a digital audio stream from an incoming call into packets. The packets are formatted then sent over an Internet Protocol (IP) network to a destination voice gateway. The destination voice gateway converts the packets back into a digital audio stream that resembles the original audio stream.

A large amount of network bandwidth is used as overhead when the digital audio steam is converted and transmitted as packets. For example, in Realtime Transport Protocol (RTP)-encapsulated VoIP, a common codec technique packetizes two 10 millisecond (ms) frames of speech into one audio packet. For a 8 kilobit per second (Kbit/s) coder, the 20 milliseconds of speech uses 20 bytes (8 bits per byte) in the audio packet. However, there are an additional 40 bytes or so in each audio packet used for overhead. For instance, 20 bytes are used for an Internet Protocol (IP) header, 8 bytes are used for a User Datagram Protocol (UDP) header, and 12 bytes for a Realtime Transport Protocol (RTP) header. The overhead to payload ratio is about 2 to 1, with two bytes of packet header for every one byte of actual audio packet payload.

A large percentage of the voice gateway's processing resources are used to encode and format the audio stream into VoIP packets. Processing resources in the voice gateway can be overloaded if too many audio streams are received and have to be processed by the voice gateway at the same time.

When the voice gateway is overloaded, it cannot encode and transmit voice packets fast enough to keep up with the amount of incoming audio data. One cause of voice gateway overload is the limited size of interface buffers used to buffer audio packets before being formatted and transmitted over the IP network. If the interface buffer fills up, the voice gateway has nowhere to store new audio packets. When the voice gateway is overloaded like this, the voice gateway starts dropping packets.

Another cause of voice gateway overload is the limited processing capacity of a Central Processing Unit (CPU) in the voice gateway. A large percentage of the voice gateway CPU processing capacity is used to switch the audio packets from the DSP to the output IP interface. Switching involves the following operations: receiving audio packets from the DSP, decapsulating, encapsulating IP and UDP headers, forwarding the packet to the correct IP interface, link layer encapsulation, queuing the packet at that interface and finally transmitting the packet. If there are too many calls to the voice gateway, the CPU cannot switch the packets fast enough for each call. The voice gateway is again overloaded and again is forced to drop packets.

Dropping packets has a detrimental effect on sound quality of the VoIP call since good sound quality depends on timely and highly reliable delivery of real time audio packets.

Accordingly, a need remains for throttling audio packets in a voice gateway without severely degrading quality of VoIP calls.

SUMMARY OF THE INVENTION

Rather than dropping packets, the invention throttles the rate that audio packets are output from a voice gateway by increasing the VoIP packet size. An encoder in the voice gateway encodes audio signals into audio packets. A processor in the voice gateway then switches the audio packets into VoIP packets each having IP headers and a packet payload. The invention throttles the rate that these VoIP packets are switched in the voice gateway by varying the number of samples of the incoming audio signals that are encoded into each packet payload.

By increasing the packet payload size in the VoIP packets, the voice gateway can switch the same amount of audio data in fewer VoIP packets. Producing fewer VoIP packets increases the available capacity of the voice gateway for other purposes. In other words, increasing VoIP packet size prevents the voice gateway from having to drop packets. If the available capacity increases (the number of calls decrease), the voice gateway can resume switching the packets at the original packet payload size.

The foregoing and other objects, features and advantages of the invention will become more readily apparent from the following detailed description of a preferred embodiment of the invention which proceeds with reference to the accompanying drawings.

DETAILED DESCRIPTION

Figure 1:
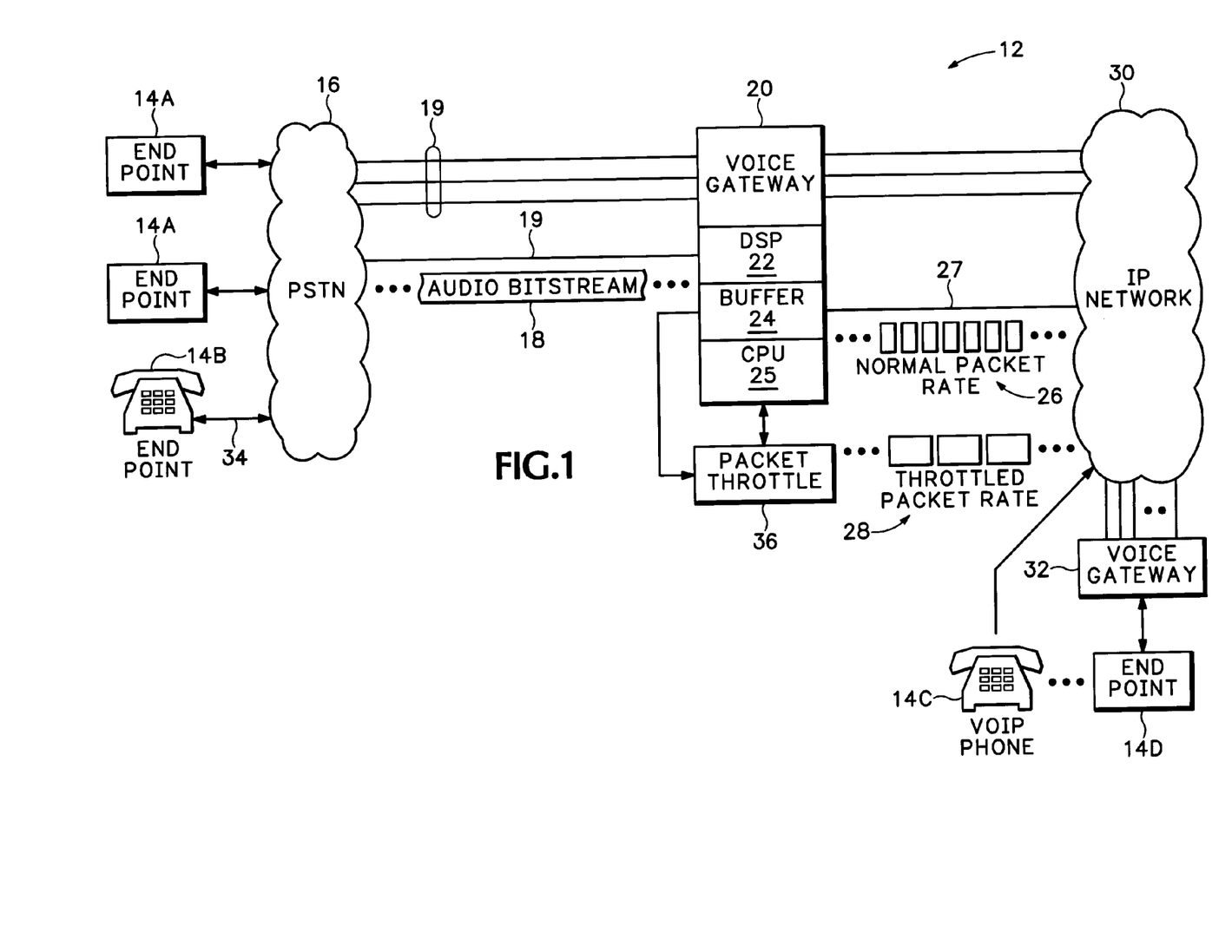
FIG. 1 is a diagram of a communications network including a gateway that throttles audio packets according to the invention.

Referring to FIG. 1, a communications network 12 includes multiple endpoints 14A-14D. Endpoints 14A-14D are phones, computers, etc. used for transmitting or receiving information, and particularly audio signals, over the communications network 12. A circuit switched Public Services Telephone Network (PSTN) 16 connects some of the endpoints 14A and 14B with a voice gateway 20. Another endpoint 14D is connected to another voice gateway 32. Both gateway 20 and gateway 32 encode and format audio signals into VoIP packets for routing over a packet switched Internet Protocol (IP) network 30. Other endpoints, such as endpoint 14C, can be a VoIP phone that converts audio signals directly into VoIP packets and then sends the VoIP packets directly to the Internet 30.

When one of the endpoints, such as phone 14B, makes a Voice over IP (VoIP) phone call, that call usually starts out by sending audio signals 34 from phone 14B over the PSTN 16. The audio signals 34 are converted by the PSTN 16 into a digital audio bitstream 18 that is sent to voice gateway 20 over a PSTN call 19. The gateway 20 includes a Digital Signal Processor 22 that encodes the audio bitstream 18 into audio packets. The audio packets are stored in a buffer 24 and formatted into VoIP packets 26 by a Central Processing Unit (CPU) 25. The VoIP packets 26 are stored in buffer 24 before being transmitted over an IP link 27 to a destination endpoint.

Any gateway 20, gateway 32 or VoIP phone 14C can provide packet throttling according to the invention. However, for simplicity, packet throttling will only be described with reference to voice gateway 20.

Utilization of CPU 25 in gateway 20 is primarily a function of packet rate. As the packet rate increases, so does the number of CPU cycles needed to switch those packets. A majority of these CPU cycles are used for decapsulating, forwarding, encapsulating and queuing the packets. For example, ten 100 byte packets will require about ten times the number of CPU cycles than required to switch a single 1000 byte packet. This is because when a packet arrives on an input interface of a network processing device, that packet is transmitted on an outbound interface of that network processing device without any payload copying. Since per packet processing is the primary consumer of CPU cycles, reducing the packet rate reduces CPU utilization.

Rather than throttling the packet rate by dropping packets, the invention throttles the rate that VoIP packets 26 are switched by gateway 20 by varying the number of samples of the audio bitstream 18 that are encoded into each of the VoIP packets 26. The throttled packet rate is represented by packets 28.

A packet throttle 36 monitors the available space in the buffer 24 and the utilization capacity of CPU 25. If the available space in buffer 24 is too low or the utilization of CPU 25 is too high, the packet throttle 36 directs the DSP 22 to encode more samples of the audio bitstream 18 into the payload of each packet 26. This encodes the same audio bitstream 18 using fewer audio packets 28.

Because the payload size in packets 28 are larger than the payload size in packets 26, fewer packets have to be switched by the CPU 25. Thus, the gateway 20 has substantially more capacity for processing additional audio bitstreams 18. When the capacity in the gateway 20 increases (i.e, fewer calls 19), the throttling condition can be removed and the payload size dropped back down to the original size in packets 26.

Figure 2:
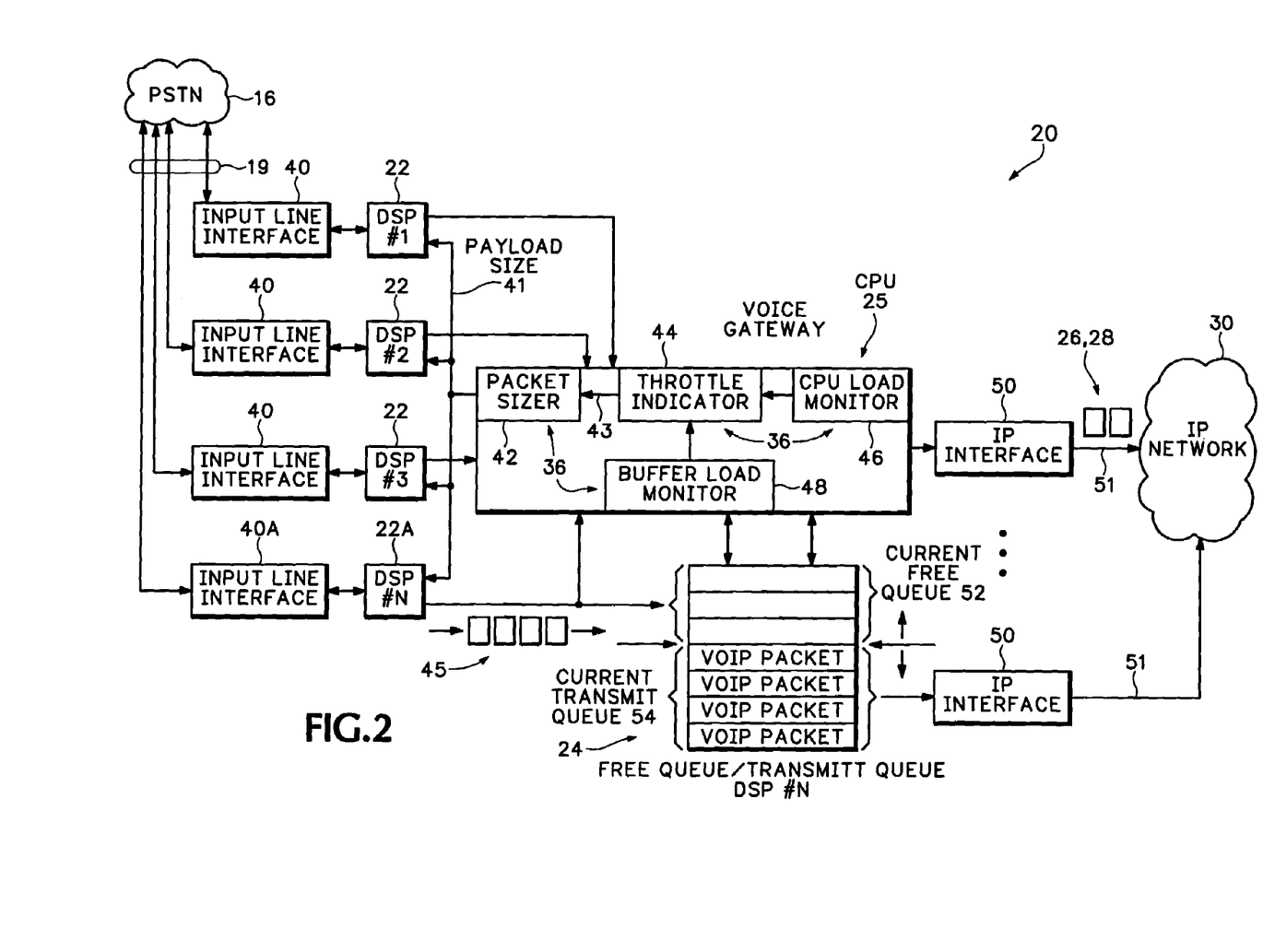
FIG. 2 is a detailed block diagram of the gateway shown in FIG. 1.

Referring to FIG. 2, the gateway 20 includes multiple line interface cards 40 that each process PSTN calls 19. The line interface cards 40 are each connected to an associated Digital Signal Processor (DSP) 22. Referring specifically to DSP 22A, a Time Division Multiplexed (TDM) bitstream from the associated line interface card 40A is encoded by DSP 22A into audio packets 45. The audio packets 45 are output to a free queue section 52 of buffer 24. The audio packets 45 in buffer 24 are switched by CPU 25 into VoIP packets and stored in a transmit queue section 54 of buffer 24. The VoIP packets in transmit queue 54 are output through an output IP interface 50 to the IP network 30.

The CPU 25 is loaded with a computer program (software) that performs the operation of the packet throttle 36 shown in FIG. 1. The computer program is stored in a computer readable media, such as a Dynamic Random Access Memory (DRAM), Read Only Memory (ROM), Electrically Erasable Programmable Read Only Memory (EEPROM), etc. The packet throttle software 36 includes a CPU load monitor 46 that monitors the utilization of the CPU 25. A buffer load monitor 48 monitors the amount of space currently available in the free queue 52. A throttle indicator 44 uses the information obtained by the CPU load monitor 46 and the buffer load monitor 48 to generate a throttle value 43. A packet sizer 42 then generates a packet payload size value 41 from the throttle value 43.

When a throttling condition is detected, a percentage of input interfaces, which in this case are DSPs 22, are notified by the packet throttle 36. Upon receipt of the notification from the packet throttle 36, some DSPs 22 are reprogrammed to increase their packet size according to the packet payload size value 41 in order to meet the requirements of the throttle request. Packet size increments are determined by system configuration.

A percentage of the DSPs 22 are throttled, rather than dropping packets. The throttled DSPs increase the VoIP packet size up to some pre-negotiated maximum. When the throttling condition is removed, such as upon a reduction in the number of calls to voice gateway 20, the VoIP packet size is dropped back down to the initial value represented by packets 26 (FIG. 1). It is assumed that the DSP endpoints in the originating gateway and the destination gateway are capable of unnegotiated or prenegotiated packet size changes.

The voice gateway 20 typically employs up to thousands of DSP interfaces 22 on a single chassis. Employing a binary throttle value on these thousands of interfaces may result in rapid changes from high load to low load conditions, and vice-versa in very short periods of time, with the additional problem of rapid oscillation between the two in a short period of time. For this reason, the throttle value 43 may include a fraction, which is proportional to the perceived load. The packet size value 41 generated in packet sizer 42 is then applied only to a number of active DSPs 22 in proportion to the throttle value fraction 43.

As the throttle value fraction 43 increases in subsequent notifications, additional DSPs 22 will be subjected to the increased packet size. As the throttle value fraction 43 decreases, the throttled DSPs 22 revert back to the smaller packet size after some time delay or when a positive delta is maintained between the actual number of DSPs 22 in the throttle state versus the throttle value 43 as the throttle value 43 declines.

The packet throttle 36 monitors the throttle indications from the CPU load monitor 46 and the buffer load monitor 48 to arrive at a percentage of DSPs 22 to throttle. This percentage is maintained by modifying the packet size on active calls and/or setting the initial packet size on new calls.

Throttle Indication from CPU Load Monitor

The load (utilization) on CPU 25 is monitored periodically by CPU load monitor 46. A 0% utilization means there is no load on the CPU 25 and a 100% utilization means the CPU 25 is fully occupied. A CPU utilization value is tracked by the operating system in voice gateway 20. The CPU load monitor 46 periodically checks this CPU utilization value. When CPU utilization value reaches some threshold, for example, 80%, the CPU load monitor 46 notifies throttle indicator 44 of the condition. The throttle indicator 44 then outputs the throttle value 43. The packet sizer 42 calculates a packet payload size 41 and a number of DSPs 22 to throttle based on the throttle value 43.

Throttle Indication from Buffer Load Monitor

Packets 45 are output from the DSP 22A to the buffer 24. The packets are taken off the buffer 24 only after being transmitted from one of the IP interfaces 50. The size of the free queue 52 is typically inversely proportional with the number of network packets in the transmit queue 54. If VoIP packets are not being released quickly, congestion on some output interfaces 50 is inferred. The DSPs 22 are not throttled by any particular output interface 50. Thus, DSP throttling is independent of any particular output switching path 51. Multiple IP interfaces 50 may service the same route for a particular IP address. If the routing circuitry in gateway 20 fairly distributes the VoIP packets from the buffer 24 to the multiple IP interfaces 50, throttling may only be necessary when all the output IP interfaces 50 experience congestion.

The buffer load monitor 48 monitors the current free queue 52 to determine when a throttle condition exists. When the current free queue 52 drops below some value, the buffer load monitor 48 notifies the throttle indicator 44. The throttle indicator 44 then updates the throttle value 43 identifying some percentage of the DSPs 22 to throttle.

Figure 3:
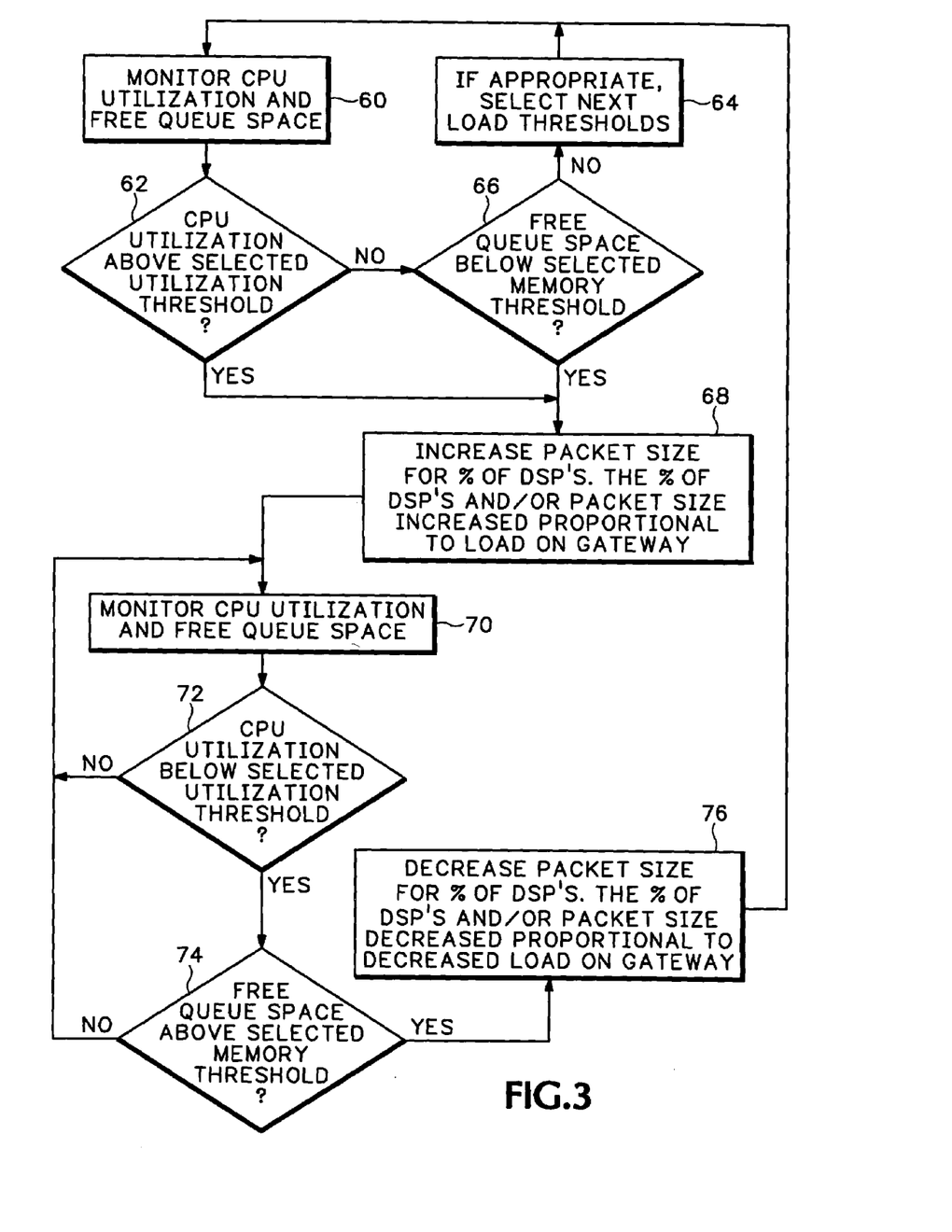
FIG. 3 is flow diagram that explains how the voice gateway in FIGS. 1 and 2 throttles audio packets.

FIG. 3 is a flow diagram explaining how the packet throttle software 36 in the gateway 20 operates. The packet throttle 36 periodically monitors the CPU utilization and free queue space in block 60. The CPU load monitor 46 (FIG. 2) determines an amount of CPU utilization in the voice gateway 20. If the CPU utilization is above a selected utilization threshold in decision block 62, the throttle indicator 44 generates a throttle value to packet sizer 42. The packet sizer 42 uses the throttle value to notify a percentage of the DSPs 22 to increase the packet payload size in block 68. The percentage of DSPs 22 that are directed to increase packet payload size and/or the amount that the packet payload size is increased is proportional to the monitored load on the gateway 20 (FIG. 1).

If free queue space 52 falls below a selected memory threshold in decision block 66, the throttle indicator 44 updates the throttle value. The packet sizer 42 then increases the packet payload size for a percentage of the DSPs 22 in block 68. Because the number of samples of the audio signals encoded into each one of the audio packets is increased, packet rate is decreased.

If the selected load thresholds in decision blocks 62 and 66 are not violated, block 64 may optionally select another set of load thresholds that represent a lower gateway load. If the new load thresholds are violated in decision blocks 62 or 66, the packet size is increased for a percentage of the DSPs as described in block 68. However, the percentage of DSPs and/or the packet size are increased proportionally to the gateway load associated with the newly selected load thresholds.

In one embodiment of the invention, the packet throttle 36 uses hysteresis when throttling the DSPs 22. This prevents the packet size from oscillating when the gateway utilization capacity hovers around a throttle threshold value.

The percentage of CPU utilization is monitored by the CPU load monitor 46 in decision block 72 until it falls below the selected CPU utilization threshold. If hysteresis is used, the value used in decision block 72 is a certain amount lower than the selected utilization threshold in decision block 62. Decision block 74 determines if the available space in free queue 52 has risen above the selected memory threshold in decision block 66. If hysteresis is used, the value used in decision block 74 is a certain amount larger than the selected memory threshold used in decision block 66.

When CPU utilization falls below the selected CPU utilization threshold and the available space in free queue 52 increases above the selected memory threshold, the throttle indicator 44 in block 76 sends a new throttle value to packet sizer 42 that decreases the packet payload size for one or more of the throttled DSPs 22. The packet payload size and/or the percentage of DSPs is decreased proportional to the reduced load on the gateway 20. Decreasing the packet payload size, in turn, increases the packet rate back to its original value.

Figure 4:
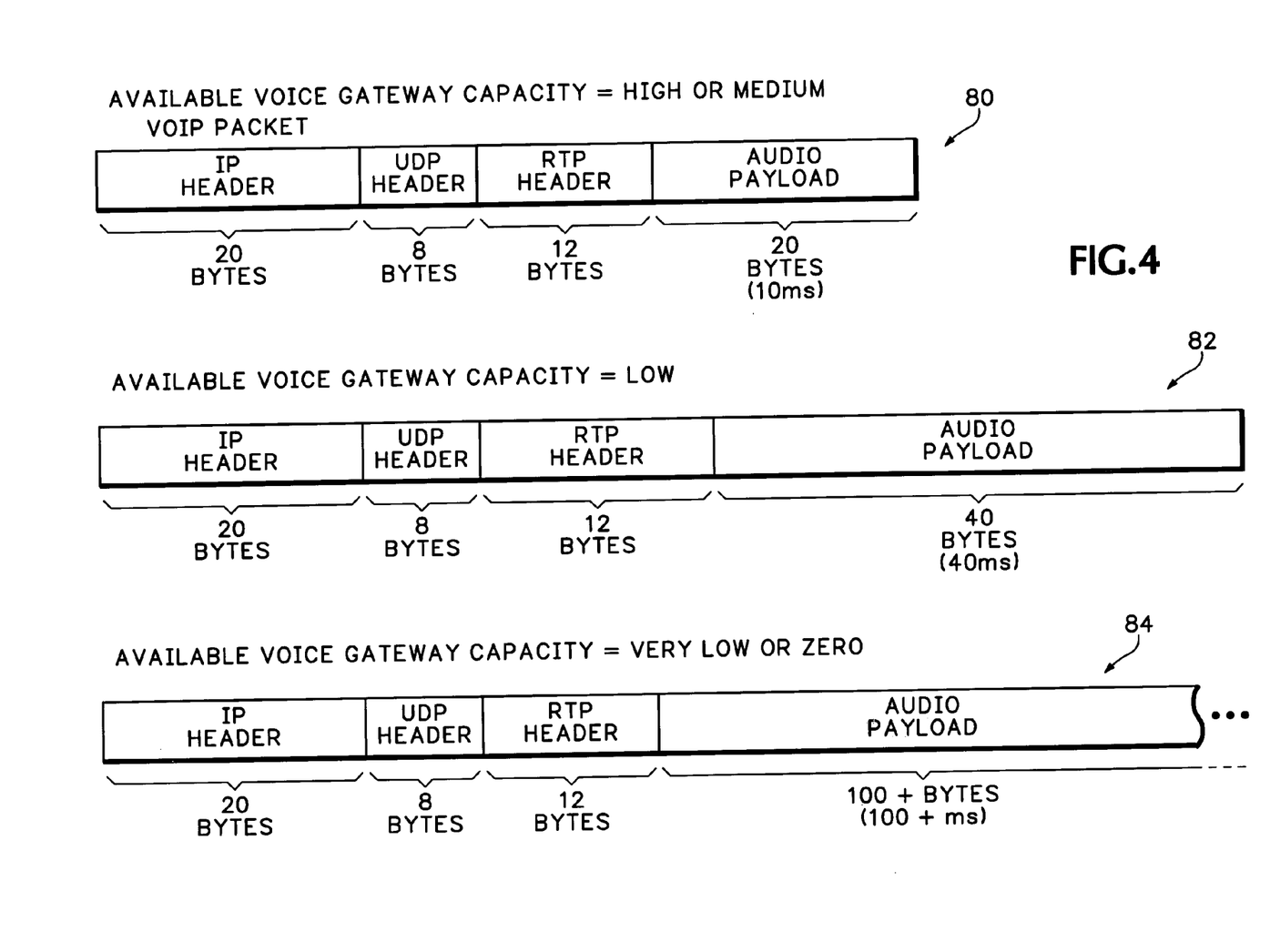
FIG. 4 is a diagram showing how the packet payload size is varied according to gateway capacity.

FIG. 4 shows how the packet throttle 36 varies the packet size according to voice gateway capacity. The amount of audio data in a VoIP packet may vary from 10-20 milliseconds (ms) up to some maximum such as 100 ms. However, smaller or larger audio payloads may be generated depending on specific network conditions.

The VoIP packets 80, 82 and 84 are transmitted over the IP network 30 (FIG. 1) using an Internet Protocol (IP). The VoIP packets include an IP header that is 20 bytes long, a User Datagram Protocol (UDP) header that is 8 bytes long, an RTP header that is 12 bytes long, and a variable sized audio payload. When the gateway 20 has high or medium capacity for processing audio signals for more incoming calls, usually 20 ms of speech are packed into VoIP packet 80. The 20 ms of speech is encoded into approximately 20 bytes of packet audio payload. The 40 bytes of overhead including the IP header, UDP header, and RTP header in packet 80 takes up two thirds of the audio packet 80. Every 20 ms. (50 times per second) a 60 byte packet 40 is then generated and transmitted by some of the DSPs 22 in gateway 20.

When the available CPU capacity for processing additional incoming calls is high or medium, VoIP packet 80 is encoded. When available CPU capacity is low, VoIP packets similar to packet 82 are generated by some of the DSPs 22. The VoIP packet 82 carries 40 ms of audio data in a 40 byte audio payload but still uses only 40 bytes of overhead.

If the available voice gateway 20 is very low or zero (no capacity for processing more incoming calls) more DSPs 22 may be throttled and/or VoIP packets generated similar to packet 84. VoIP packet 84 has a still larger audio payload of 100 ms. or more. The overhead ratio and packet rate for transmitting 100 ms of speech is reduced further. The size of the audio packets and audio packet payloads is contained in the packet header information. Thus, no modifications have to be made to existing network transport protocols.

One advantage of the invention is that the rate that packets are output from the gateway 20 are throttled with only a small level of noticeable degradation in voice quality. For example, switching from 20 millisecond (ms.) packets to 40 ms. packets result in an additional 20 ms. end to end delay across the packet switched network 30. Conversely, dropping packets results in significant voice quality degradation due to lack of data. Dropping packets also causes some level of jitter buffer adjustment since packet loss effects the playout point.

The throttle technique described could be used in combination with other systems that are used to maintain Quality of Service on the IP network 30. For example, Co-pending U.S. patent application Ser. No. 09/181,947 entitled: CODEC-INDEPENDENT TECHNIQUE FOR MODULATING BANDWIDTH IN PACKET NETWORK filed on Oct. 28, 1998 varies packet payload size based on measured network congestion.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A gateway for throttling network packets generated from an audio signal, comprising:
   an encoder to encode the audio signal into audio packets; and
   one or more processors to convert the audio packets into the network packets, the one or more processors to control an amount of the audio signal that the encoder encodes into the audio packets according to available utilization capacity of the gateway for converting additional audio packets into network packets, wherein the available utilization capacity corresponds with an amount of audio signaling received by the gateway from a Public Switched Telephone Network (PSTN) for converting into the network packets and is independent of an amount of congestion on an Internet Protocol (IP) network used for transferring the converted network packets.

2. The gateway according to claim 1 including:
a buffer having a free queue that receives the audio packets from the encoder, the available utilization capacity of the gateway varying according to space available in the free queue for receiving the audio packets.

3. The gateway according to claim 2 wherein the one or more processors increase an amount of samples of the audio signal the encoder encodes into the audio packets when space available in the free queue falls below a first threshold and decrease the amount of samples of the audio signal the encoder encodes into the audio packets when space available in the free queue rises above a second threshold greater than the first threshold.

4. The gateway according to claim 1 including multiple encoders all associated with the same gateway each encoding audio signals into audio packets for a different incoming call, the one or more processors varying a percentage multiple ones of the encoders associated with the same gateway that increase the audio packet size according to the utilization capacity of the gateway.

5. A system for throttling network packets generated from an audio signal, comprising:
an encoder to encode the audio signal into audio packets;
a buffer to store the audio packets;
a processor to convert the audio packets into the network packets; and
a load monitor configured to monitor either an amount of available space in the buffer or an amount of available processing capacity in the processor and determine an available utilization capacity for at least one of the buffer and the processor by comparing the monitored amount of available space to a first threshold value or comparing the monitored amount of available processing capacity to a second threshold value; and
a throttle indicator configured to control an amount of the audio signal that the encoder encodes into the audio packets according to the monitored available utilization capacity.

6. The system according to claim 5 wherein:
the system is configured to convert the audio signal received from a Public Switched Telephone Network (PSTN) into the network packets and transmit the network packets over a Internet Protocol (IP) network; and
the utilization capacity varies according to an amount of the audio signal from the PSTN that need to be converted into network packets for transmitting over the IP network.

7. The system according to claim 5 including multiple encoders each encoding audio signals into audio packets for a different incoming call and for converting into network packets by the same one or more processors, the same processors varying a percentage of the encoders that increase the audio packet size according to the utilization capacity.

8. The system according to claim 5 wherein the encoder encodes about 20 milliseconds of the audio signal into the audio packets when the available utilization capacity is greater than a first threshold, encodes about 40 milliseconds of the audio signal into the audio packets when the available utilization capacity falls below the first threshold, and encodes more than 60 milliseconds of the audio signal into the audio packets when the available utilization capacity falls below a second threshold less than the first threshold.

9. The system according to claim 5 wherein the audio signal is received over an incoming Public Services Telephone Network (PSTN) call and the network packets are IP packets transferred out over an IP network.

10. A method for throttling network packets in a voice gateway, comprising:
encoding audio signals;
formatting the encoded audio signals into Voice Over Internet Protocol (VoIP) packets using a processing unit;
storing the VoIP packets in a buffer;
monitoring utilization of at least one of the buffer and the processing unit;
controlling size of the VoIP packets by varying a number of samples of the encoded audio signal in the VoIP packets according to the monitored utilization;
increasing the number of samples of the audio signals in the VoIP packets when an increased number of audio signals are received for formatting into the VoIP packets; and
decreasing the number of samples of the audio signals in the VoIP packets when a decreased number of audio signals are received for formatting into the VoIP packets,
further comprising using multiple digital signal processors to encode multiple audio signals at the same time and varying a percentage of the digital signal processors that increase the VOIP packet size according to amount of free space in the buffer and an amount of processing capacity in the processing unit.

11. The method according to claim 10 including formatting the encoded audio signals using the processing unit and varying the VoIP packet size according to an amount of processing capacity of the processing unit used for formatting the encoded audio signal into VoIP packets.

12. The method according to claim 11 including:
storing the VoIP packets in the buffer before transmitting the VoIP packets over a VoIP network;
monitoring the buffer by determining an amount of free space in the buffer currently not storing VoIP packets; and
controlling the VoIP packet size according to the amount of free space currently in the buffer.

13. The method according to claim 12 including periodically monitoring the amount of free space in the buffer and the available processing capacity of the processing unit and controlling the VoIP packet size according to that periodic monitoring.

14. The method according to claim 10 wherein formatting the encoded audio signal into VoIP packets includes the following:
attaching an Internet Protocol header to the encoded audio signal;
attaching a User Datagram Protocol (UDP) header to the encoded audio signal; and
attaching a Realtime Transport Protocol (RTP) header to the encoded audio signal.

15. The method according to claim 10 including increasing a number of samples of the audio signal in the VoIP packets when utilization in the buffer is above a first threshold and lowering the number of samples of the audio signal samples in the VoIP packets when utilization in the buffer drops below a second threshold lower than the first threshold.

16. A computer readable medium containing instructions that when executed by a computer, comprise:
monitoring utilization of a processor in the network processing device;

monitoring utilization of a buffer that buffers audio packets in the network processing device; and generating a throttle value according to the monitored processor utilization and monitored buffer utilization, the throttle value used by the network processing device to vary an amount of an audio signal that is encoded into the audio packets, wherein size of the audio packets are throttled in a percentage of multiple digital signal processors wherein the percentage is proportional to the throttle value.

17. The computer readable medium according to claim 16 wherein a number of samples of the audio signal encoded into the audio packets is increased when the monitored processor utilization reaches a first processor utilization threshold or the monitored buffer utilization reaches a first buffer threshold.

18. The computer readable medium according to claim 17 wherein the number of samples of the audio signal encoded in the audio packets is decreased when the monitored processor utilization drops below a second processor utilization threshold lower than the first processor utilization threshold and the monitored buffer utilization drops below a second buffer threshold lower than the first buffer threshold.

19. A system for throttling network packets in a voice gateway, comprising:

means for encoding an audio signal;

means for formatting the encoded audio signal into Voice over Internet Protocol (VoIP) packets using a processing unit;

means for storing the VoIP packets in a buffer;

means for monitoring utilization of at least one of the buffer and the processing unit;

means for controlling size of the VoIP packets by varying a number of samples of the encoded audio signal in the VoIP packets according to the monitored utilization; and means for increasing a number of samples of the audio signal in the VoIP packets when utilization in the buffer is above a first threshold and lowering the number of samples of the audio signal samples in the VoIP packets when utilization in the buffer drops below a second threshold lower than the first threshold.

20. The system according to claim 19, wherein the means for controlling the size of the VoIP packets include increasing the number of samples of the encoded audio signal in the VoIP packets when the monitored utilization indicates high utilization of at least one of the buffer and the processing unit.

21. The system according to claim 19 including means for formatting the encoded audio signals using the processing unit and varying the VoIP packet size according to an amount of processing capacity of the processing unit used for formatting the encoded audio signal into VoIP packets.

22. The system according to claim 21 including:

means for storing the VoIP packets in the buffer before transmitting the VoIP packets over a VoIP network;

means for monitoring the buffer by determining an amount of free space in the buffer currently not storing VoIP packets; and means for controlling the VoIP packet size according to the amount of free space currently in the buffer.

23. The system according to claim 22 including means for periodically monitoring the amount of free space in the buffer and the available processing capacity of the processing unit and controlling the VoIP packet size according to that periodic monitoring.

24. The system according to claim 22 including means for using multiple digital signal processors to encode multiple audio signals at the same time and varying a percentage of the digital signal processors that increase the VoIP packet size according to the amount of free space in the buffer and an amount of processing capacity of the processing unit used for switching the encoded audio signal to the IP network.

25. A system according to claim 19 including:

means for attaching an Internet Protocol header to the encoded audio signal;

means for attaching a User Datagram Protocol (UDP) header to the encoded audio signal; and means for attaching a Real-time Transport Protocol (RTP) header to the encoded audio signal.

* * * * *

UNITED STATES PATENT AND TRADEMARK OFFICE
CERTIFICATE OF CORRECTION

| | |
|---|---|
| PATENT NO. | : 7,567,576 B2 |
| APPLICATION NO. | : 11/031254 |
| DATED | : July 28, 2009 |
| INVENTOR(S) | : James Murphy |

It is certified that error appears in the above-identified patent and that said Letters Patent is hereby corrected as shown below:

Column 1, Line 3, insert heading -- RELATED APPLICATION DATA --.

Column 8, Line 10, delete "Over" and insert -- over --, therefor.

Column 8, Line 27 (approx.), delete "VOIP" and insert -- VoIP --, therefor.

Signed and Sealed this

Twenty-second Day of December, 2009

David J. Kappos
*Director of the United States Patent and Trademark Office*